United States Patent [19]

Lewis

[11] 4,135,606
[45] * Jan. 23, 1979

[54] CAPILLARY ACTION BRAKE SHOE: VACUUM SUCTION TYPE

[76] Inventor: Nathanial H. Lewis, P.O. Box 20424, Pasadena, Calif. 90006

[ * ] Notice: The portion of the term of this patent subsequent to Jun. 14, 1994, has been disclaimed.

[21] Appl. No.: 793,059

[22] Filed: May 2, 1977

[51] Int. Cl.² ............................................. F16D 69/00
[52] U.S. Cl. .................................... 188/24; 188/73.1; 188/250 B; 188/256; 188/264 A
[58] Field of Search ..................... 188/24, 71.6, 73.1, 188/250 R, 250 B, 250 E, 251 R, 253, 256, 261, 264 R, 264 B, 264 A, 264 AA

[56] References Cited

U.S. PATENT DOCUMENTS

| | | | |
|---|---|---|---|
| 562,346 | 6/1896 | Whitcomb | 188/256 |
| 943,995 | 12/1909 | Reid | 188/264 R |
| 1,143,518 | 6/1915 | Duschnitz | 188/256 |
| 1,303,172 | 5/1919 | De France | 188/261 |
| 1,510,825 | 10/1924 | Bousquet | 188/264 B |
| 2,241,218 | 5/1941 | Pickard | 188/261 |
| 2,406,067 | 8/1946 | Eurit | 188/261 |
| 2,748,902 | 6/1956 | Foster | 188/261 |
| 2,851,132 | 9/1958 | James | 188/261 |
| 3,835,963 | 9/1974 | Ohtani | 188/24 |
| 3,840,093 | 10/1974 | Hamayasu | 188/24 |
| 4,029,181 | 6/1977 | Lewis | 188/73.1 |

Primary Examiner—Edward R. Kazenske

[57] ABSTRACT

A brake block for a rim brake assembly of a bicycle which has a wheel rim. The brake block comprises an elongated body member of frictional material and has a face with cavities therein. The body has a longitudinal hole extending from end to end therein. Narrow holes or porous inserts connect the longitudinal hole with the face surface and the cavities.

2 Claims, 3 Drawing Figures

CAPILLARY ACTION BRAKE SHOE: VACUUM SUCTION TYPE

This invention is an improvement over the invention of U.S. Pat. No. 4,029,181 named CAPILLARY ACTION BRAKE SHOE. The novelty of this invention comprises one or more cavities or chambers incorporated into the face of a brake block. Air is sucked out of said cavities through narrow holes or porous inserts incorporated in the body of said block, when said face meets the rim. High speed air pass through one or more longitudinal holes adjacent and communicating with said narrow holes or porous inserts, when the bicycle is in motion. This will carry away-by suction-heat and water vapor from said block and said rim, and air from said cavities. Vacuums are created inside said cavities; thereby, said face is pressed tighter against said rim.

The objects and advantages of said invention will become better understood hereinafter, from a consideration of the specification; with reference to the accompanying drawings forming part thereof and in which like parts throughout the several views of said invention, and wherein.

Figure 1:
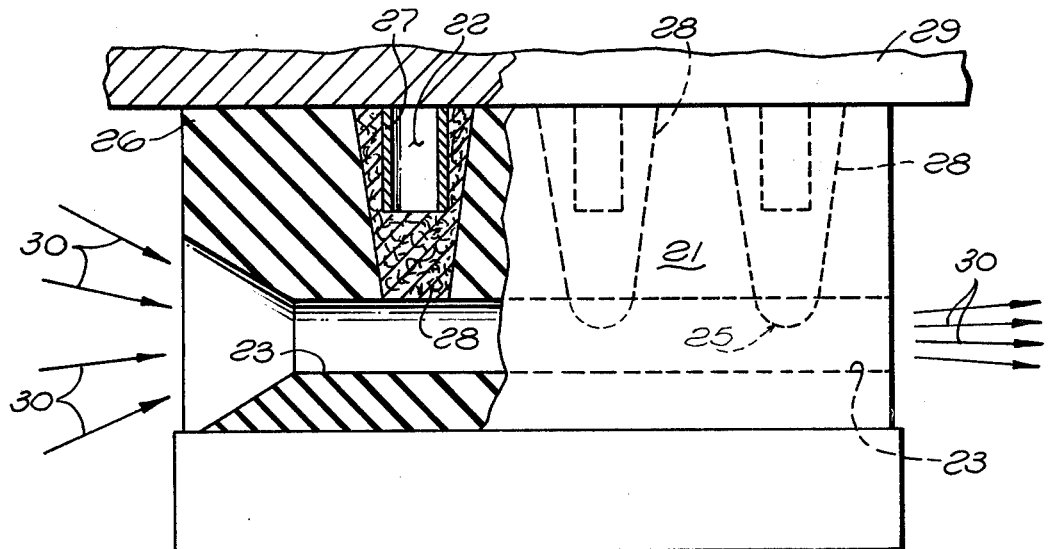
FIG. 1 is a fragmentary top view of a brake block pressed against a rim.

Refer to FIG. 1. A rectangular brake shoe 20 comprises a holder and bolt 24 holding a block 21. The block 21 comprises a longitudinal hole(s) 23 and one or more porous inserts 28. An insert 28 comprises a cavity 22 and a very soft metal support post 27, such as lead. When the bicycle is in motion; high speed air 30 passing through the hole 23 will carry away-by suction-heat and/or water vapor from the block 21 and the rim 29, and air from the cavities 22. The front edge 26 will wipe away most of the water from the rim 29. A temporary nozzle(s) can be inserted into the hole 23 adjacent an insert(s) 28; or a permanent nozzle(s) can be incorporated into the hole 23 adjacent an insert(s) 28. This nozzle(s)-a section of reduced cross-section area-would increase the speed of the air 30 through the hole 23. A much simpler method would be to add a protuberant face 25 to each of the inserts 28.

Figure 2:
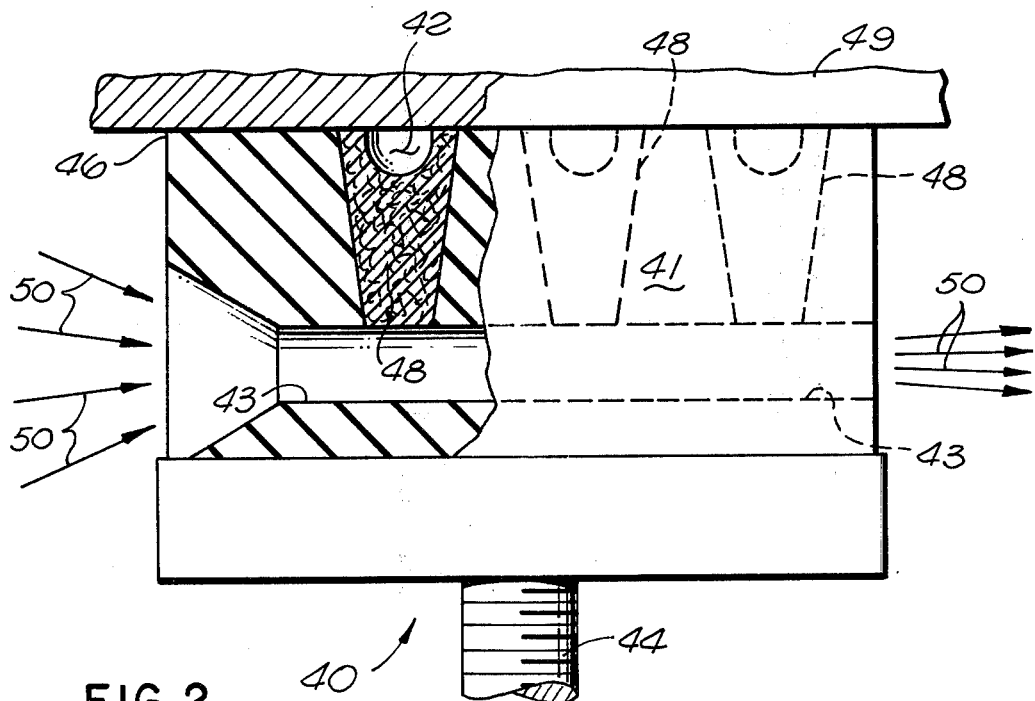
FIG. 2 is a fragmentary top view of a brake block pressed against a rim.

Refer to FIG. 2. A rectangular brake shoe 40 comprises a holder and bolt 44 holding a block 41. The block 41 comprises a longitudinal hole 43 and one or more porous inserts 48. An insert 48 comprises a cavity 42 having a shape substantially that of a half-sphere. When the bicycle is in motion; high speed air 50 passing through the hole 43 will carry away-by suction-heat and/or water vapor from the block 41 and the rim 49, and air from the cavities 42. The front edge 46 will wipe away most of the water from the rim 49.

Figure 3:
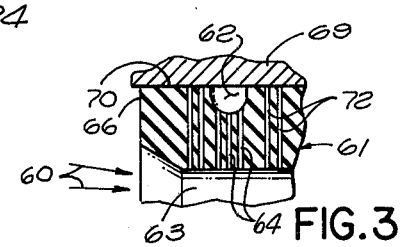
FIG. 3 is a reduced sectional view of part of a brake block and rim combination.

Refer to FIG. 3. A block 61 with its face 70 against a rim 69. The block 61 comprises narrow holes 64 and 72, a longitudinal hole(s) 63, and one or more cavities 62. A plurality of narrow holes 64 connect each cavity 62 with the longitudinal hole 63. A plurality of narrow holes 72 connect the face 70 with the longitudinal hole 63; these holes 72 are optional. When the bicycle is in motion; high speed air 60 passing through the hole 63 will carry away-by suction-heat and/or water vapor from the block 61 and the rim 69, and air from the cavities 62. The front edge 66 will wipe away most of the water from the rim 69. The narrow holes 64 and 72 can be incorporated in a random or a regular pattern(s) throughout the brake block 61.

The concept of suction-by Bernoulli's principle in many cases-is presently applied to numerous highly successful inventions. The venturi of a carburetor, the spray gun, the bath room plunger, the wing of an airplane just to name a few; then there is the hoofs of various animals found in nature, such as the mountain goat. The same is true for the concept of capillary action. Thereby, the concepts used in this invention are not questionable. However, the determination of the best material(s) to use has to be made through testing. The material(s) would probably have to meet the specifications of U.S. Consumer Product Safety Commission (CPSC) and the International Standards Organization (ISO).

The concepts incorporated into this invention would greatly improve the braking ability of all types of rim brakes. This invention can be applied to all types of brake blocks. The X-pattern, the angled face, the chevron shaped treads, and the curved brake block, these are only a few. However, many feel that the plain continuous brake block is the best.

Having thus described said invention, it is to be understood that certain modifications in the construction and arrangement of the parts thereof will be made, as believed necessary, without departing from the scope of the attached claims.

The following is claimed:

1. An improved brake block of the type for a rim brake assembly of a bicycle having a wheel rim, said brake block comprising an elongated body member of frictional material and having one face thereof with a plurality of porous inserts embedded therein, said porous inserts being made from an absorbent material having capillary action and frictional properties, said porous inserts having a first face thereof exposed on said face of said body member to contact said rim, said body member having a longitudinal hole extending therethrough from end to end thereof and being substantially parallel to said face of said body member, said porous inserts having a second face adjacent and communicating with said longitudinal hole, wherein the improvement comprises: said first face of said porous inserts having a cavity embedded therein and adjoining said first face; thereby upon movement of said bicycle and rotation of said wheel rim air is forced through said longitudinal hole causing a suction of air out of said cavity when said brake block is in contact with said rim, and creating a partial vacuum therein, this causing said brake block to be pressed tighter against said rim.

2. An improved brake block as claimed in claim 1, wherein said longitudinal hole has a size at one end greater than the size of the other end thereof.

* * * * *